United States Patent [19]
Moore

[11] 3,883,871
[45] May 13, 1975

[54] METHOD AND MODULATION SYSTEM FOR AMBIGUITY REDUCTION IN PULSED RADAR

[76] Inventor: Randolph G. Moore, 3836 N. 60th Pl., Phoenix, Ariz. 85251

[22] Filed: Mar. 12, 1973

[21] Appl. No.: 340,501

[52] U.S. Cl. ............................ 343/17.2 R; 393/17.2
[51] Int. Cl. .............................................. G01s 9/23
[58] Field of Search ................................ 343/17.2 R

[56] References Cited
UNITED STATES PATENTS

| | | | |
|---|---|---|---|
| 3,188,637 | 6/1965 | Mortley | 343/17.2 R |
| 3,745,578 | 7/1973 | Barrett, Jr. et al. | 343/17.2 R |

*Primary Examiner*—T. H. Tubbesing
*Attorney, Agent, or Firm*—Vincent J. Rauner; Maurice J. Jones, Jr.; Sang Ki Lee

[57] ABSTRACT

The modulation system of a pulsed radar includes a modulator having a generator for providing a radar pulse repetition frequency (PRF) signal and which pulse modulates a single frequency oscillator to develop a pulse modulated signal. The PRF signal also drives a divider circuit that creates a divided control signal in phase coherence with the PRF signal. The divided control signal enables a linear sawtooth frequency modulated (FM) oscillator to provide an FM signal having a modulation rate which is a submultiple of the PRF. The total deviation of the FM signal is a function of the PRF. A mixer circuit combines the FM and pulse modulated signals, and the sums of the frequency components thereof are selected by a filter to provide a modulated output signal which is suitable for being transmitted by a radar either directly or on a carrier. The modulated signal rotates the time-frequency plane of the pulse modulation ambiguity response pattern of the radar with respect to the amplitude axis so that unwanted ambiguities are shifted off of the time and frequency axes to facilitate velocity and range measurement.

25 Claims, 12 Drawing Figures

METHOD AND MODULATION SYSTEM FOR AMBIGUITY REDUCTION IN PULSED RADAR

BACKGROUND OF THE INVENTION

A basic function of a radar modulation system is to facilitate accurate transformation of the times, and changes of frequency, between electromagnetic signals respectively into the range and velocity parameters of a chosen target. The target range and velocity data has a multiplicity of well-known applications in airborne and ground-based equipments. The acquisition of such data is beset with difficulty imposed by the nature of radar itself and by the nature of the environment in which the radar operates.

More particularly, some types of radar have inherent ambiguity problems which result as the radar creates more than one choice for a desired target parameter, such as range or velocity, but only one choice is appropriate. This ambiguity problem, which results from the transmission of discontinuous radar pulses, is represented by ambiguity peaks which may be plotted at the coordinates of the frequency-time plane. consideration of the ambiguity plot leads to an understanding of the problem and its solution.

The spacing of the ambiguity peaks is a function of the particular modulation parameters of the radar. Regardless of the modulation, if one pulse is transmitted there may be no ambiguity in the measurement of target range but measurement of target velocity is difficult; and if a continuous wave (C.W.) radar signal is transmitted, there may be no ambiguity in the measurement of doppler frequency, but measurement of range is difficult. As a prior art compromise, pulse trains of intermittant sinusoidal signals having repetition rates on the order of millions of cycles per second are transmitted. High repetition rates prevent the doppler effect from distorting the frequency response of the return signal and thereby impairing the determination of the velocity of the target, while still enabling measurement of range.

The higher the repetition rate the more difficult range measurements become. More specifically, in response to each pulse, echoes return immediately from objects close to the radar and at later times from objects farther from the radar. As the repetition rate increases, the likelihood increases that echoes from previous pulses off of objects other than the target will return during the time-window that echoes from the desired target return. As a result, it is difficult to determine which of the returning signals are reflections from the target of a particular transmitted pulse and which are from previous or later transmitted pulses. Since the range or distance of a target from the radar is determined by utilizing the time it takes for the given transmitted pulse to return from the target, the difficulty of determining the range of a target increases with the increase of pulse repetition rate or pulse repetition frequency (PRF). This uncertainty is graphically represented in terms of ambiguity peaks along the time axis of an ambiguity graph which comprise the correlation function for the radar.

On the other hand, the difficulty of determining the velocity of a target decreases with an increase in pulse repetition rate and increases with a decrease in pulse repetition rate. The velocity ambiguity is graphically represented by ambiguity peaks along the frequency axis. Velocity and range ambiguities are represented by peaks at corresponding frequency and time coordinates. Spreading of the ambiguities peak along one axis by adjusting the repetition rate results in moving the ambiguities peaks closer together on the other axis. More specifically, an increase in the pulse repetition rate separates the frequency or velocity ambiguity peaks so that there are less of them within given target velocity limits of interest but creates more ambiguity peaks along the time axis so that there are more ambiguity peaks within the range limits of interest. Also, a decrease in the pulse repetition rate separates the time or range ambiguity peaks so that there are less of them within given target range limits but creates more ambiguity peaks along the frequency or velocity axes.

Analogous ambiguity problems result from linear, FM modulated signals wherein velocity ambiguity problems are reduced by an increase in the modulation rate but the range ambiguity problems are increased by the increase in the modulation rate. The effect is vice versa for a decrease in the modulation rate.

Moreover, difficulties inherent in radar itself are encountered with respect to resolution, which is the property of a radar to distinguish between different targets. Resolution is needed when similar targets are in close proximity such as a flight of aircraft in formation, a satellite in the presence of its booster stage, or a missile warhead surrounded by a swarm of decoys. To accomplish resolution it is necessary for the radar to separate echoes off of the chosen target from echoes off of other objects and from signals originating from external sources. The radar must be able to detect narrow pulse widths to accomplish resolution and have a minimum number of time-frequency ambiguities in the areas of the range-velocity plane of interest.

Problems impairing accurate formulation of target parameters encountered by radars may be accentuated by the environment in which the radar operates. For instance, when a radar is utilized in airborne applications such as for collision avoidance or missile guidance, the problems are greater than those encountered by ground-based radars. In such airborne applications, acquisition of the range and velocity of a target is complicated by the many possible relative positions of the target with respect to the radar transmitter. More particularly, the target may be either coming directly at the antenna, receding from the antenna, crossing the radar beam or moving at the same speed as the antenna, and at altitudes above, below or equal to that of the antenna. When the target, such as a supersonic aircraft, is moving toward an antenna which is also moving at a supersonic speed, the relative velocity between radar and target can be much higher than velocities normally measured by ground-based radar. Hence, since the required repetition rate for accurate measurement of velocity is proportioned to the velocity, airborne radar focusing on airborne targets require increased modulation rates as compared to ground-based radar focusing on the same targets. As previously mentioned, the increase in modulation rate increases range ambiguities.

Moreover, radars of aircraft or missiles flying at relatively low altitudes severe clutter signals caused by encounter severe reflection of the radar signal off of the ground environment and off of such weather conditions as clouds, fog and drizzle. These clutter signals further complicate the synthesis of velocity and ranging information because of radar response ambiguity peaks.

Conventional prior art pulse modulation and prior art frequency modulation radars have ambiguity response characteristics comprised of a multiplicity of unwanted ambiguity response peaks on their frequency and time axis which makes them sensitive to clutter signals and high level corrupting signals. Ground-based radar systems utilizing relatively sophisticated computer controlled phase shifters for modulating and demodulating the transmitted radar signal have been employed for either attenuating the unwanted ambiguity peaks within the range-velocity area of interest or shifting them out of the area of interest. Moreover, such ground-based systems sometimes transmit large quantities of power on the order of thousands of watts in order to solve the aforementioned problems.

Neither sophisticated nor high power prior art systems are suitable for use in airborne radars. High power solutions are not suitable because airborne radars usually derive their power from the sources on the aircraft or missile and therefore may be limited to peak power outputs less than ten watts. Furthermore, the sophisticated prior art systems are not suitable for use in airborne applications because of their complexity which increases cost and because of their large weight and space requirements. Prior art methods of reducing unwanted ambiguity responses by various cancellation techniques aimed at reducing the amplitudes of unwanted peaks have also generally been too expensive for large quantity applications.

SUMMARY OF THE INVENTION

An object of this invention is to provide an improved modulation method and system for use in airborne, air target acquisition pulsed radars.

Another object of this invention is to provide an improved pulsed radar modulation system having relatively unambiguous frequency and time measurements as compared to prior art systems to facilitate derivation of velocity and range information relating to rapidly moving targets.

Still another object of this invention is to provide an improved pulsed radar modulation system suitable for utilization with radar transmitters having only moderate peak, and average power outputs.

A further object of this invention is to provide an improved pulsed radar modulation system and modulation method for reducing range and frequency ambiguity problems.

A still further object of the invention is to provide an improved pulsed radar modulation system which provides a selected combination of pulse and frequency modulation and which is simple, inexpensive, reliable and compact.

In brief, the modulation code generator and modulation method of the invention are suitable for use in a pulsed radar system to shift some of the unwanted ambiguity peaks off of the time and frequency axes to thereby facilitate unambiguous range and velocity measurements. The modulation code generator includes a PRF oscillator having an output which controls the timing of signals generated by first and second oscillators which have outputs connected to a mixer. The first oscillator is comprised of a single frequency oscillator which is gated on and off by the PRF signal to provide a pulse modulated, sinusoidal signal which is applied to one of the inputs of the mixer. The pulse modulated signal has a frequency which is higher than the PRF and a repetition rate which is equal to the PRF. The second oscillator provides a frequency modulated (FM) signal having a frequency which varies as a function of a control voltage applied to a control terminal thereof. Moreover, oscillation of the second oscillator is terminated in response to a reset pulse applied to a reset terminal thereof. A divider circuit divides down the PRF signal to provide the reset pulses. The existence of each reset pulse gates the second oscillator off. The nonexistence of each reset pulse gates the second oscillator on and initiates the generation of a linear sawtooth voltage which is applied to the frequency control terminal of the second oscillator which varies the frequency thereof in a predetermined manner. The deviation of the FM signal of the second oscillator is adjusted to be a perfect multiple of the PRF, and the modulation rate is chosen to be a submultiple of the PRF. Since the gating and modulation of the pulse modulated and FM signals are controlled by the PRF generator, these signals are created in phase synchronism with each other. The mixer, in effect, multiplies together the correlation functions of the pulse modulated signal and the FM signal. By making the deviation of the FM signal equal to the PRF of the pulse modulated signal, for instance, and the modulation rate of the FM signal a submultiple of the PRF, the nodes or zero points of the FM signal correspond to undesired ambiguity peaks of the pulse modulated signal along the time and range axes. Hence, the multiplication tends to reduce, if not eliminate, the amplitude of the undesired ambiguities falling on the time and range axes so that the range and velocity of the target can be accurately determined.

DETAILED DESCRIPTION OF THE PREFERRED EMBODIMENT

Figure 1:
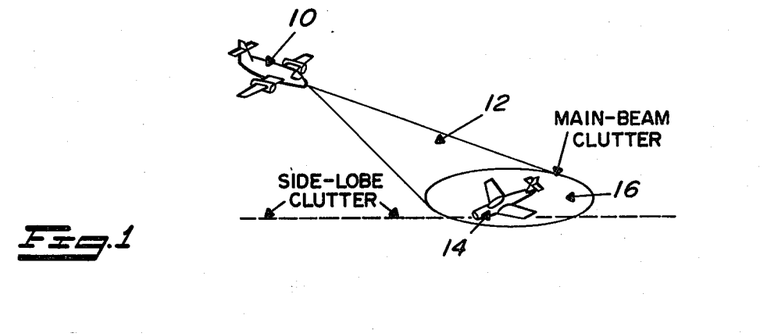
FIG. 1 illustrates an aircraft carrying a radar focused on a target aircraft.
Figure 2:
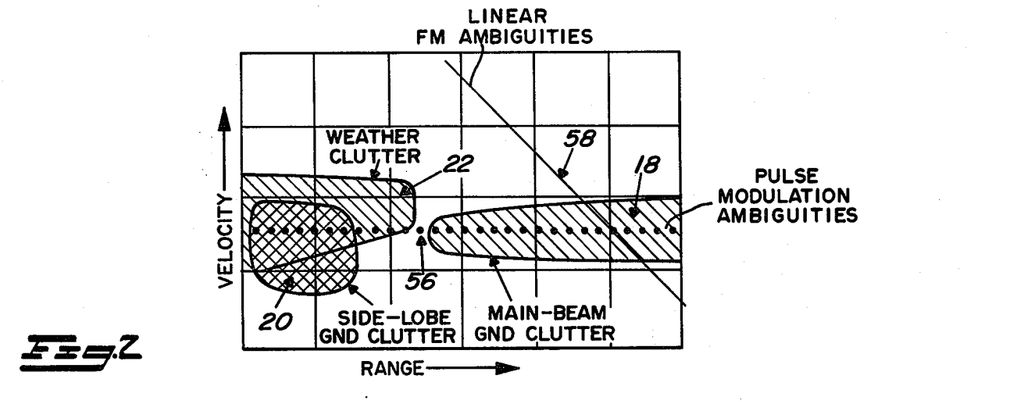
FIG. 2 is a clutter map illustrating some possible types of clutter to which an airborne radar may be subjected and the peak ambiguity responses of prior art radars employing pulse modulation and frequency modulation.

An aircraft 10 is illustrated in FIG. 1 as including an airborne radar which focuses a beam of electromagnetic signals 12 upon an aircraft of interest or target 14. The transmitted signals are reflected by the target to create echoes which return to the radar. By comparing the characteristics of the reflected and transmitted signals, the radar determines desired information about the target. Unfortunately, radars receive echo signals from objects other than the target. FIG. 2 illustrates, among other things, a map showing clutter as a function of velocity and range of target 14 with respect to any airborne radar. Clutter may be defined as a conglomeration of unwanted radar echoes which tend to confuse or degrade the quality of desired radar information. Because these echoes clutter the radar display, they make the recognition and interpretation of desired echo signals from target 14, for instance, difficult.

More specifically, signals of beam 12 which are reflected from the ground are referred to as "main beam ground clutter." This clutter is represented on the map of FIG. 2 by area 18. Similarly ground clutter caused by the side lobe transmission from the radar of aircraft 10 is designated as "side lobe ground clutter" and is illustrated by area 20 of the map. The higher the airborne radar is above the ground the greater will be the amount of ground clutter the radar will "see." Furthermore, weather conditions, such as echoes from distributed rain fall, within the scope of beam 12 of the radar might create "weather clutter" indicated by area 22. Moreover, clutter is continually changing because of the motion of the aircraft. Intereference from extraneous signals such as are radiated by other radars, and communication and countermeasure transmitters tend to also interfere with the performance of the radar. Prior art methods of distinguishing a moving target in the presence of clutter by taking advantage of doppler shift in frequency produced by a target in motion or by less sophisticated means such as attenuating the clutter signal by selectively reducing the gain of the radar have not been completely satisfactory.

Figure 3:
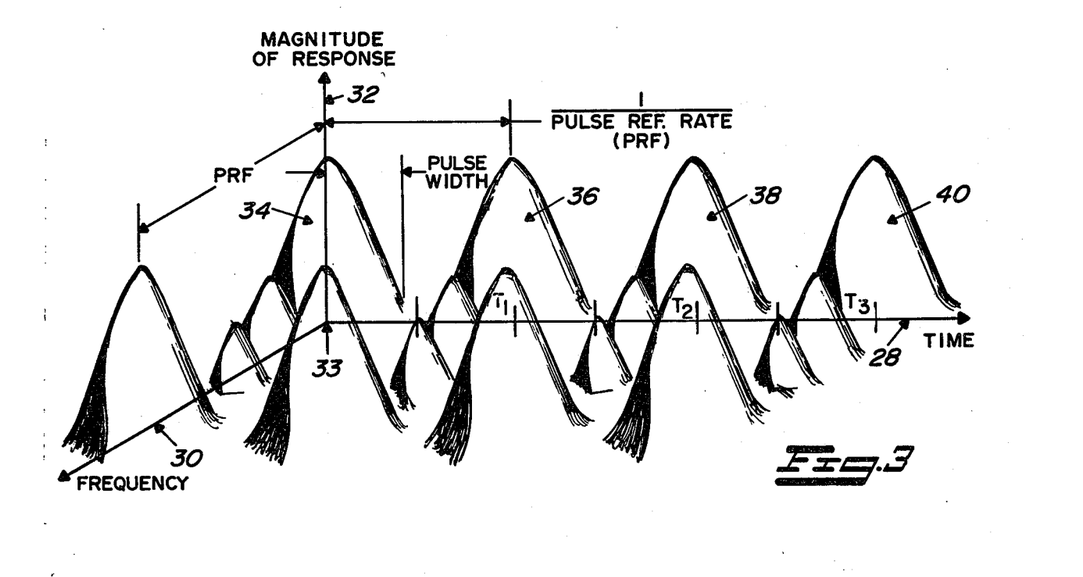
FIG. 3 is an ambiguity diagram representing essentially a response plot for a prior art pulsed, doppler radar.

FIG. 3 is an isometric or three dimensional representation or graph of the ambiguity response characteristics for a prior art, pulse modulated doppler radar as a function of time, frequency and amplitude as indicated respectively along mutually perpendicular axes 28, 30, and 32, which intersect at origin 33. Time measurements between transmitted and reflected radar signals, which are referred to axis 28, are required to enable synthesis of target range. Comparison of the doppler shift of a reflected signal with respect to the frequency of a transmitted signal, which are referred to axis 30, are required to enable synthesis of relative target velocity. To facilitate the purposes of an airborne radar of measuring target speed and velocity, it would be desirable if the radar had only the peak response 34 located near origin 33. The ideal ambiguity diagram or response characteristic consists of a single peak of infinitesimal thickness at the origin to permit the frequency and the echo delay time to be determined simultaneously and to as high a degree of accuracy as desired. A single peak of infinitesimal thickness would also permit the resolution of two targets no matter how close they are to each other. Peak 34 at origin 33 of FIG. 3 is not ideal in terms of resolution because it has a finite thickness. However, peak 34, by itself does not result in an ambiguity since it provides only one value of target range and only one value of target velocity, even though that single peak might be too broad to satisfy some requirements of accuracy and resolution.

As shown in FIG. 3, a conventional pulse modulated doppler radar has a plurality of ambiguity peaks located at various time-frequency coordinates. The higher the repetition rate (PRF) of the pulse modulated doppler radar signal, the farther apart are the peaks on frequency axis 30. Furthermore, the higher the PRF, the closer together are the peaks on time axis 28. All of the peaks other than peak 34 are undesirable because they cause ambiguities in the form of a plurality of possible values for a desired parameter, such as range or velocity, from which the radar must choose. Thus, there is a trade off between reducing ambiguities in either the range or velocity information by adjusting the PRF.

More particularly, as shown in FIG. 3, the prior art pulse doppler radar has a plurality of ambiguity responses such as 36, 38 and 40 which are located on time axis 28. This plurality of peaks result from the discontinuous nature of the pulse modulated doppler signal and cause the radar to respond simultaneously to signals occurring at times $T_1$, $T_2$, and $T_3$ which could correspond, for instance, to ranges of 4,000, 8,000, and 12,000 feet with respect to a range gate setting. These signals, which cause responses at times other than the target time, could be from echoes off of clutter, objects other than a target and from other sources. As a result, it is difficult to correlate a return signal from the target with the corresponding transmitted signal so that the time therebetween can be ascertained. Thus, the radar only can determine that the target range is one of a plurality of possible ranges which are multiples of a given range. Similarly the velocity of the target can only be determined to be one of a plurality of values Since the plurality of peaks of the ambiguity function of FIG. 3 enables clutter and other signals to complicate the desired signal comparison, it is desirable to eliminate these peaks from the target range-velocity area of interest. By careful choice in parameters, the height of the peak 34 at origin 33 can be accentuated with respect to the peaks of the other signals. However, the amplitudes of the unwanted peaks cannot be reduced to zero. The total volume enclosed by all the peaks of a radar ambiguity response characteristic is proportioned to the energy of the transmitted signal.

Figure 4:
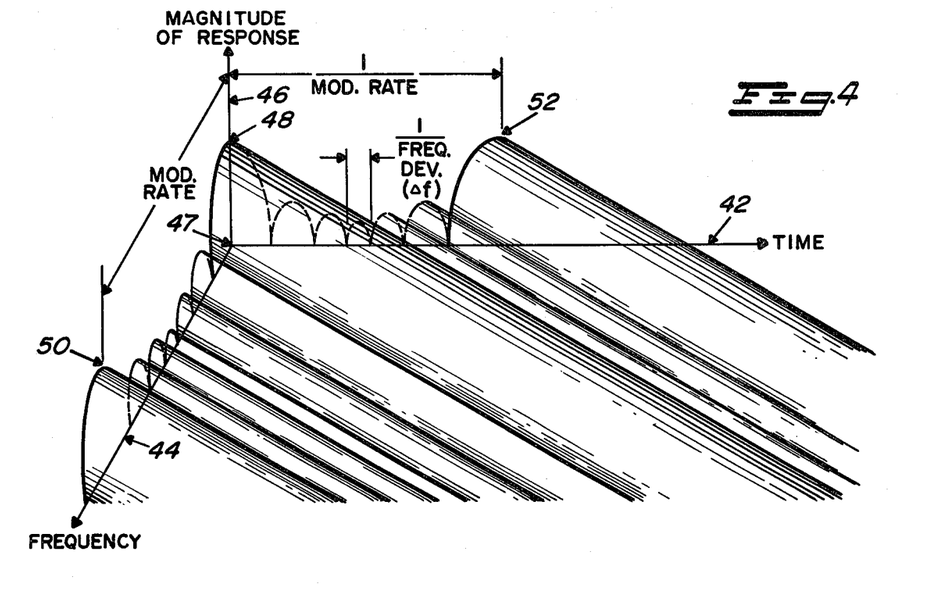
FIG. 4 is an ambiguity diagram representing essentially a response plot for a prior art linear, sawtooth frequency modulated radar.

FIG. 4 is an isometric representation or map of an ambiguity characteristic for a prior art, linear sawtooth, frequency modulated (FM) radar. The time, frequency and amplitude characteristics are measured respectively along mutually perpendicular axes 42, 44 and 46, which intersect at origin 47. The spacing between the adjacent center frequencies of large peaks, i.e., 48 and 50 along frequency axis 44 is a function of the modulation rate of the transmitted wave. The time differential between large peaks, i.e., 48 and 52, along time axis 42, is inversely proportional to the modulation rate. The width of each of the small lobes occurring along time axis 42 and hence the number of small lobes existing between large peaks 48 and 52 is inversely proportional to the frequency deviation. Thus, a trade off between time and frequency ambiguity based on modulation rate exists for a linear sawtooth FM signal which is similar to the trade off based on PRF for a pulse modulated doppler signal. Again, all of the response characteristics existing other than near origin 47 of FIG. 4 are undesirable because they cause ambiguity.

The frequency-time planes of the radar ambiguity maps of FIGS. 3 and 4 are related to the clutter map of FIG. 2 by translating time and frequency values into corresponding range and velocity values and properly scaling them so that the time-frequency planes superimpose upon the clutter map of FIG. 2. The solid circles 56 extending parallel to the range axis of FIG. 2 represent peaks such as 34, 36, 38 and 40 along time axis 28 of FIG. 3. The solid line 58 (in effect, a very thin rectangle) on FIG. 2 corresponds to the ambiguity characteristic of a prior art linear sawtooth FM radar corresponding to peak 48 of FIG. 4. For the representation of FIG. 2, it is assumed that the pulse repetition frequency and deviation are high enough so that the other peaks of the pulse modulated and FM ambiguity functions fall outside of the desired area of interest. As shown in FIG. 2, there are a multiplicity of possibilities for clutter signals to enter the prior art pulse modulated and FM radars and thereby complicate identification of a desired echo signal utilized for determining range if the PRF and deviation are high enough to provide unambiguous velocity measurements.

The deficiencies of the prior art apparatus and systems are substantially diminished, if not eliminated, according to the invention.

Figure 5:
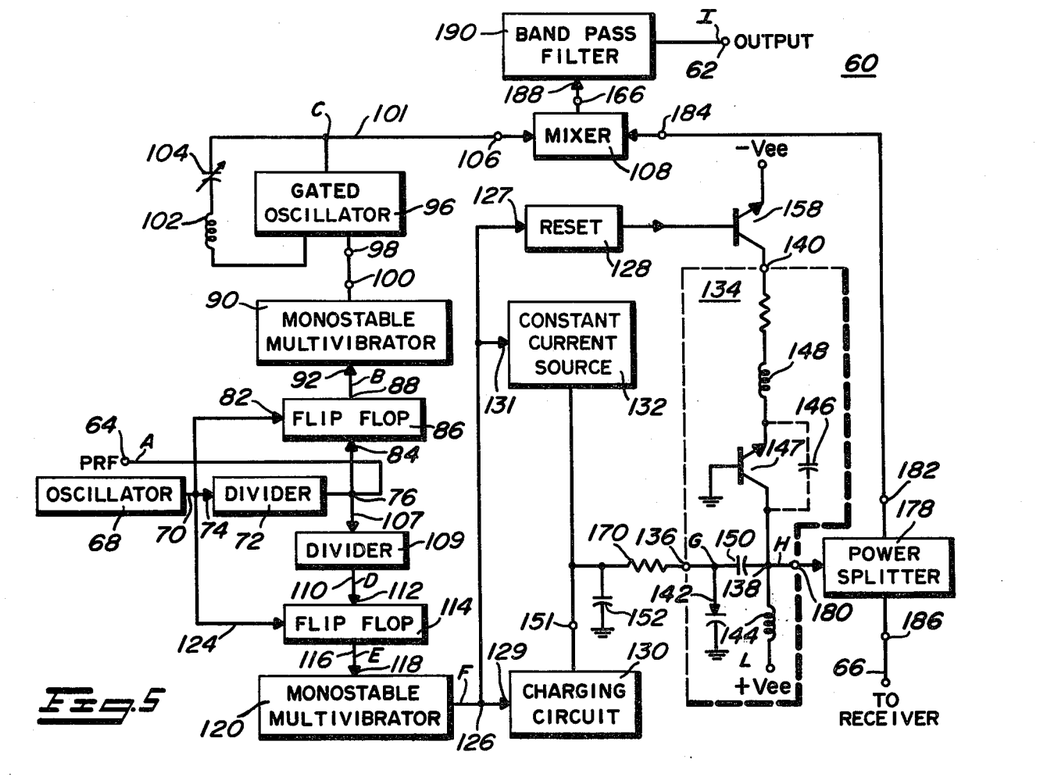
FIG. 5 is a block and schematic diagram of a modulation code generator according to the invention.
Figure 6:
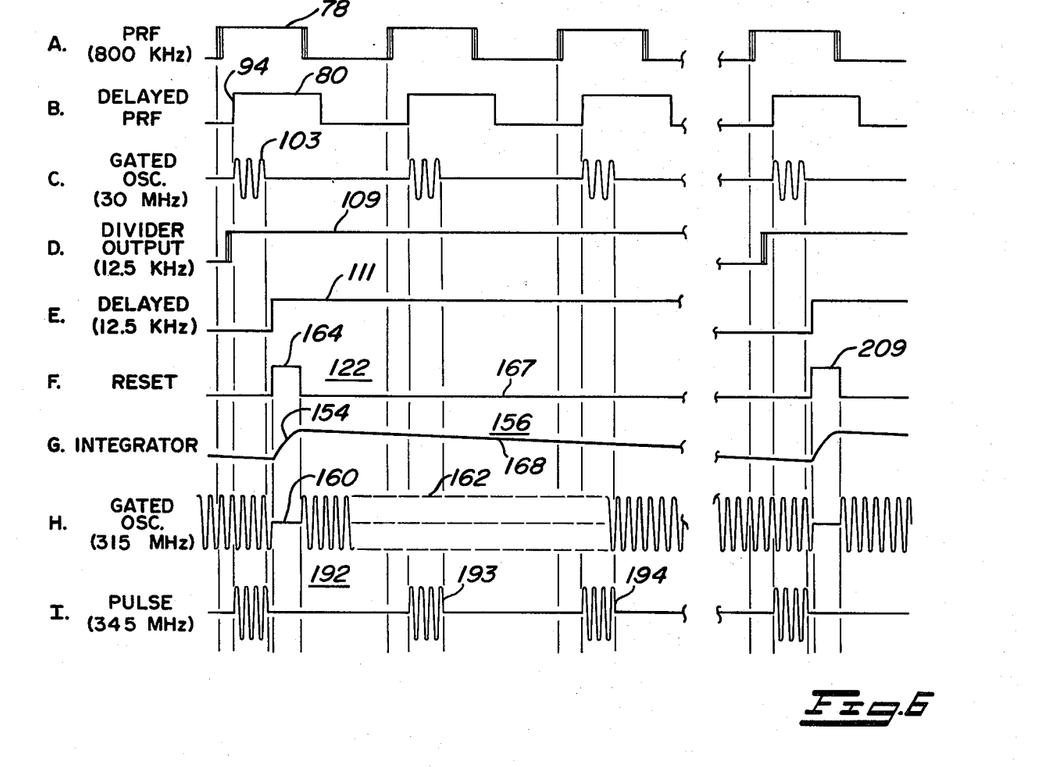
FIG. 6 is a code generator timing diagram illustrating the operation of the modulation code generator of FIG. 5.

FIG. 5 is a part block and part schematic diagram illustrating the structure of a modulation code generator 60 of one embodiment of the invention which reduces the amount of range ambiguity corresponding to a particular PRF for a pulse modulated doppler signal or a particular frequency deviation for an FM signal. Generator 60 provides a modulated output signal at output 62, a PRF signal at output 64, and a linear sawtooth FM receiver local oscillator signal at output 66. The modulated signal at output 62 includes a combination of the pulse modulated and FM signals which have a predetermined relationship to each other in accordance with the invention. The utilization of the modulator output signals in a particular microwave radar system will be described with respect to FIG. 9. The timing diagram of FIG. 6 shows waveforms at various points in the circuit of FIG. 5 which are useful in understanding the operation of modulation code generator 60 and thus the method of modulation of the invention.

The generation of the PRF signal will first be explained in detail. Oscillator 68 of FIG. 5 is crystal controlled to provide a signal at output 70 thereof which has a high degree of frequency stability. Divider 72, which has an input 74 connected to output 70 of the oscillator divides the output frequency of the oscillator to form the PRF signal at output 76. In one application where an 800 kilohertz (kHz) PRF signal is chosen because it removes frequency ambiguities from the velocity limits of possible targets, oscillator 68 may oscillate at a constant frequency of 25.6 megahertz (MHz) and divider 72 may be a divide-by-32 circuit which provides the 800 kHz PRF. Oscillator 68 and divider 72, and other circuits of modulator 60 may be formed from emitter coupled logic (ECL) type integrated circuitry. ECL circuits have high frequency responses which provide fast rise times that are essential to the operation of modulator 60. Divider 72 causes a very slight amount of leading edge jitter in the PRF signal at terminal 76, which is connected to PRF output terminal 64. This jitter has an insignificant affect upon the operation of the portions of the radar system external to code generator 60. PRF signal 78 is illustrated by train of square waves in line A, of FIG. 6.

Next, the generation of the pulse modulated waveform will be described. The outputs of oscillator 68 and divider 72 are connected to inputs 82 and 84 bistable multivibrator (delay flip-flop) 86 which re-establishes the leading edge of the PRF signal. Flip-flop 86 compares the 800 kHz PRF signal with the 25.6 MHz oscillator signal to thereby provide a delayed PRF signal 80 having virtually no leading edge jitter at output terminal 88. Delayed PRF signal 80 is shown in line B of FIG. 6. Monostable multivibrator 90, which has an input 92 connected to output terminal 88 of flip-flop 86, responds to the leading edges 94 of delayed PRF signal 80 to provide gating pulses for controlling the turn-on and turn-off of high frequency, gated oscillator 96. The duration of each gating pulse may be on the order of .125 microseconds which is one-tenth of the 1.25 microsecond period of the square wave type PRF signal.

Gate terminal 98 of high frequency, gated oscillator 96 is connected to output terminal 100 of monostable multivibrator 90. Gated oscillator 96 responds to each of the gating pulses to provide a burst of sinusoidal output signal of constant frequency at output terminal 101 thereof to provide a train of bursts which form pulse modulated, sinusoidal signal 103 shown in line C of FIG. 6. Oscillator 96 is designed so that each burst starts at the same phase point in a cycle. Gated high frequency oscillator 96 may be comprised of ECL cross coupled gate circuits having a series feedback path including inductor 102 and capacitor 104 for controlling the frequency of oscillation at 30 MHz. The oscillator output terminal 101 is connected to a first input terminal 106 of mixer 108. Thus, the top branch of the circuit of FIG. 5 generates a series of continuous frequency bursts or pulse modulated sinusoidal signals 103, each burst having on the order of 3 or 4 cycles. The beginning and termination of each burst has a predetermined time relationship to the rising portion of the delayed PRF signal and the starting phases of each burst are the same. Hence, waveform 103 of FIG. 6, line C, is in phase synchronism with PRF signals 78 and 80 of lines A and B.

Next the generation of the linear sawtooth, frequency modulated signal will be described. Output terminal 76 of divider 72 is connected to the input 107 of divider 109, which divides the PRF signal by 64, to provide rectangular waveform 109 of FIG. 6, line D, as its output terminal. Thus waveform 109 has a 12.5 kHz repetition rate. A first input 112 of delay flip-flop or bistable multivibrator 114 is connected to output 110 of divider 108 and a second input 124 of flip-flop 114 is connected to output 70 of oscillator 68. Flip-flop 114 forms a delayed rectangular signal 111 at output 116 thereof which is phase coherent and delayed with respect to signal 109 and the output signal of crystal oscillator 68 as illustrated at line E, of FIG. 6. Flip-flop 114 removes any leading edge jitter created on waveform 109 by dividers 72 and 109. Hence, waveform 111 which is also at a 12.5 kHz repetition rate has a precisely determined leading edge that is phase coherent with respect to the PRF signal, as shown in FIG. 6.

Input terminal 118 of monostable multivibrator 120 is connected to output terminal 116 of delay flip-flop 114. The multivibrator (flip-flop) 120 responds to the rising edges of the pulses of rectangular waveform 111 to provide reset signals 122 which are phase coherent with waveform 111 and have a time duration on the order of .2 microseconds. Reset signals 122 are shown at line F of FIG. 6. Output terminal 126 of multivibrator 120 is connected to the control terminal 127 of reset circuit 128, the control terminal 129 of capacitor charging circuit 130 and to the control terminal 131 of constant current source 132.

A gated, ultra high frequency (UHF) oscillator 134 responds to a voltage of changing magnitude at control terminal 136 to provide a corresponding linear change in the frequency of the sinusoidal output signal at terminal 138. Moreover, UHF oscillator 134 responds to the existence and nonexistence of a reset signal of a negative polarity applied to reset terminal 140 to respectively terminate and initiate the output signal at output terminal 138 in a precise timed relationship to the reset signal. The frequency determining feedback path of oscillator 134 includes voltage variable capacitor 142, inductor 144 and the collector-emitter capacitance 146 which is inherent in transistor 147. The inductance values of radio frequency coil 148 and the capacitive value of coupling capacitor 150 are chosen to have negligible effect upon the frequency of oscillation.

More specifically, the existence of reset pulse 122, occurring at the output of multivibrator 120 renders constant current source 132 and UHF oscillator 134 inoperative and charging circuit 130 operative. Thus, during the .2 microsecond duration of reset pulse 122, charging circuit 130 provides current at output 151 thereof which is connected to integrating capacitor 152. This current rapidly charges capacitor 152 as indicated by the rising portion 154 of waveform 156, shown at line G of FIG. 6. Oscillator reset circuit 128 level shifts, inverts, and shapes each reset pulse to provide a signal which turns off transistor 158 to remove the supply voltage from control terminal 140 which renders UHF oscillator 134 inoperative during the time of pulse 122. This gating action is indicated by portion 160 of gated oscillator output waveform 162 of line H of FIG. 6. Thus capacitor 152 is charged while UHF oscillator 134 is inoperative.

In response to the change of reset pulse 122 from its high level 164 to its low level 167, the constant current source 132 begins to discharge integrating capacitor 152 in a linear fashion as indicated by the linear portion 168 of waveform 156 to form a linear sawtooth or ramp signal. Also, charging circuit 130 is rendered inoperative and UHF gated oscillator 134 begins oscillating in synchronism with the foregoing downward transition of reset pulse 122. As the voltage across integrating capacitor 152 is discharged, the voltage applied to varactor diode 142 which is connected through resistor 170 and control terminal 136 to capacitor 152 also decreases. The resulting change in capacitance of capacitor 142 causes the frequency of UHF oscillator 134 to be swept from 314.6 MHz, which corresponds to the highest magnitude of sawtooth signal 168, to 315.4 MHz, which corresponds to the lowest magnitude of sawtooth signal 156. The total deviation is adjusted to be equal to the PRF which is 800 kHz. Furthermore, the amplitude of the ramp signal could be adjusted to cause the deviation to be some perfect multiple of the PRF other than one. Since the frequency of the UHF oscillator is periodically swept in response to the recurring linear sawtooth, the generated waveform 162 is designated as being a linear sawtooth FM signal. The modulation rate of signal 162 is determined by the repetition rate of sawtooth 156 which is a submultiple of the PRF, i.e., 64.

Power splitter circuit 178 has input terminal 180 connected to output 138 of UHF oscillator 134 and a first ouput 182 connected to input 184 of mixer 108 and a second output 186 connected to output 66 of the modulator, which is connected to a mixer circuit (FIG. 9) of the radar receiver, as will be subsequently described. Power splitter 178 divides the linear sawtooth, FM signal 162 between each of outputs 182 and 186. Mixer 108 mixes the 100 percent, pulse modulated sinusoidal signal 103 of VHF oscillator 96 with the linear sawtooth, FM signal 162 of UHF oscillator 134 and provides at least the sum and difference of the frequency components of waveforms 162 and 103 at output terminal 166, which is connected to the input terminal 188 of bandpass filter 190. The sums of the frequency components of the signals at output 166 of mixer 108, which are centered at a frequency of approximately 345 MHz, are selected and applied to output terminal 62 of code generator 60 by bandpass filter 190. Waveform 192 of line I of FIG. 6 illustrates the composite, modulated output signal formed by the combination of FM and pulse modulated signals which is provided by code generator 60.

Figure 7:
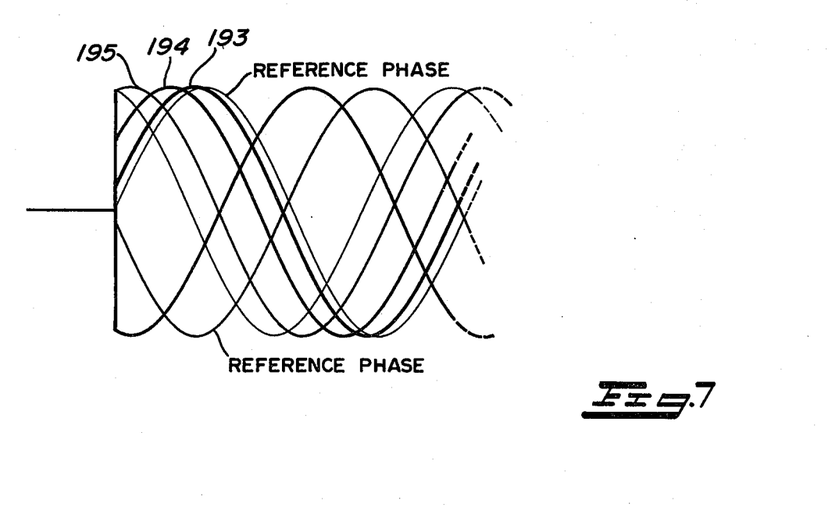
FIG. 7 shows expanded sections of successive initial portions of the output signal of the modulation code generator of FIG. 5.

The combination of pulse modulated signal 103 and FM signal 162 causes the starting phases of the resultant output signal 192 to vary from pulse to pulse within a given modulation cycle. More specifically, there is a geometric progression in phase between adjacent pulses of composite signal 192 within a modulation cycle as shown in FIG. 7. The total relative phase shift with respect to a chosen reference phase will tend to increase during each modulation period. For instance, first pulse 193 of FIG. 6, line I, occurring after reset pulse 122 of FIG. 6, line F, has a phase difference of for instance 7° with respect to the starting phase of waveform 162 of FIG. 6, line H, as indicated in FIG. 7. Second pulse 194 of FIG. 6, line I, then has a phase shift on the order of 28° with respect to the reference phase provided by waveform 162. Similarly, a third pulse, which is not shown in FIG. 6, would have a relative phase shift of 63° as indicated by waveform 195 of FIG. 7. Hence, there is a geometric progression in phase from one pulse to the next during a given modulation cycle.

Figure 8:
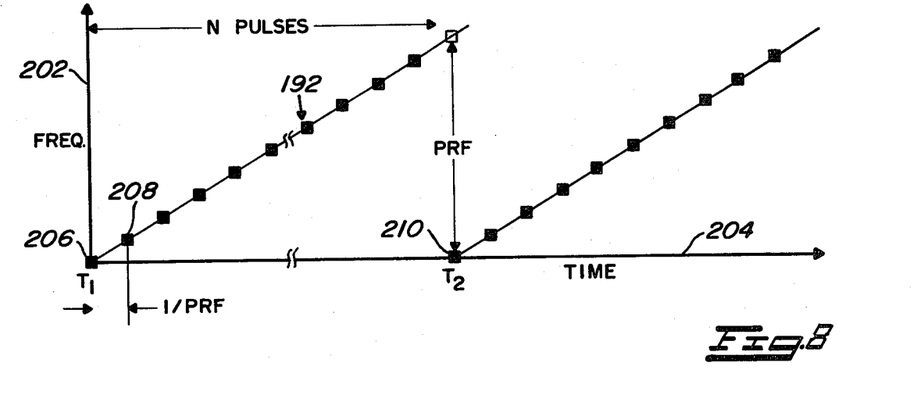
FIG. 8 is a graph further illustrating the modulated output signal generated by the modulation code generator of FIG. 5.

FIG. 8 represents output signal 192 of modulator 60 during two complete modulation cycles of sawtooth 156. More specifically, FIG. 8 shows the frequency, measured with respect to axis 202, as a function of time, measured with respect to time axis 204 of output signal 192. The time of a complete modulation cycle is indicated by the interval between times $T_1$ and $T_2$ along axis 204 which correspond to the time between successive reset pulses 122 of FIG. 6, line F. Burst 206 corresponds to the portion of output signal 192 formed by the mixture of the first burst of waveform 103 occurring after reset pulse 164, of FIG. 6, line C, and the simultaneously existing portion of waveform 162. Similarly, the burst 208 is formed by the mixture of the second burst of waveform 103 occurring after the reset pulse 164, and the corresponding portion of waveform 162, which has increased slightly in frequency due to the decrease of the magnitude of sawtooth 156. Thus burst 208 has a slightly higher center frequency than burst 206. Successive bursts continue to have increased center frequencies as illustrated in FIG. 8 until a total of 64 bursts have been created. After the desired number of output bursts have been created, and in time correspondence to the generation of subsequent reset signal 209 as shown in FIG. 6, the UHF oscillator 134 is reset and begins at time, $T_2$, to form a new cycle by creating burst 210 as shown in FIG. 8. As indicated in FIG. 8, the time between each burst is equal to the period of the PRF signal because the repetition rate of pulse modulated signal 103 is equal to the PRF.

Figure 9:
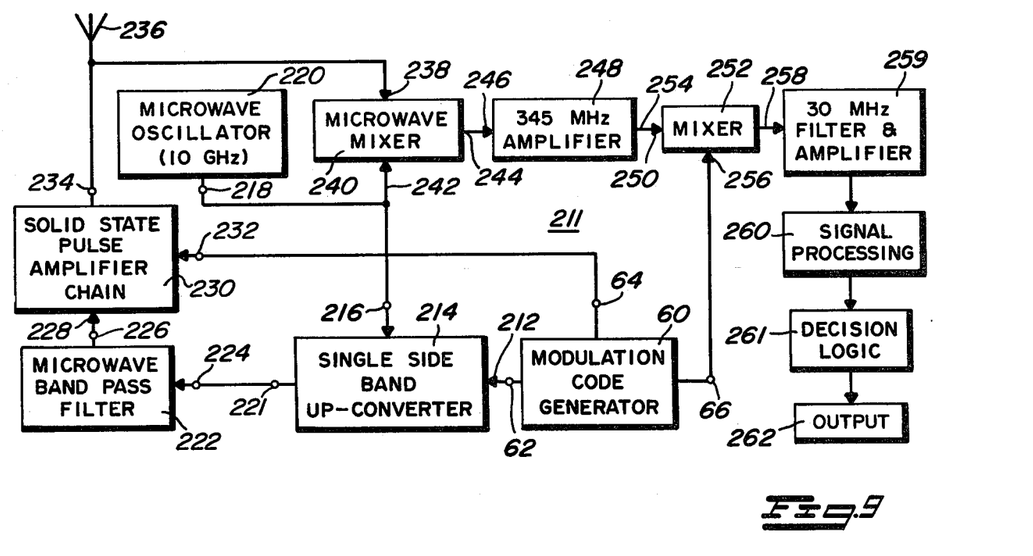
FIG. 9 is a block diagram of a microwave radar system according to the invention which includes the modulation code generator of FIG. 5.

FIG. 9 shows microwave system 211 according to the invention including modulation code generator 60. The output terminals of modulation code generator 60 of FIG. 9 have the same reference numbers as in FIG. 5. Modulated output signal 192 is connected to first input 212 of single sideband up-converter 214. Second input 216 of the up-converter is connected to output terminal 218 of microwave oscillator 220 which provides a carrier signal having a frequency on the order of 10 gigahertz. The sums and differences of the frequency components of the carrier signal and the modulator output signal 192 are created at up-converter output terminal 221. Microwave bandpass filter 222, which has an input 224 connected to output 220, selects and applies the upper sideband of the modulated, microwave carrier through output terminal 226 to input terminal 228 of gated, pulse amplifier chain 230. PRF output terminal 64 of modulation code generator 60 is connected to the gate terminal 232 of pulse amplifier chain 230 so that the PRF signal can gate the amplifier chain in phase synchronism with the existence of modulated signal 192. Pulse amplifier chain 230 is gated on and off to conserve power which ultimately must come from the power supply of the aircraft carrying airborne radar system 211. Output terminal 234 of amplifier 230 is connected to antenna 236 through which the modulated radar signal is transmitted.

Echo signals from the transmitted radar signal return through antenna 236 and are applied to first input 238 of microwave mixer circuit 240. Second input 242 of mixer 240 is connected to output terminal 218 of microwave oscillator 220. Mixer 240 down-converts the received signal and applies it through its output terminal 244 to input terminal 246 of intermediate frequency (I.F.) amplifier 248 which has a passband centered about 345 MHz. Input 250 of mixer 252 is connected to output 254 of I.F. amplifier 248 for receiving the amplified I.F. signal. Second input 256 of mixer 252 is connected to output 66 of modulation code generator 60 for receiving linear sawtooth, FM signal 162 of line H, FIG. 6. By mixing signal 162 and the I.F. signal, mixer 252 provides a 30 MHz output signal at terminal 258 thereof which is successively processed by filter-amplifier 259, signal processor 260, and decision logic 261 to provide the required data and control signals to output block 262 to give range and velocity information. The signal processing performed by blocks 259, 260, 261, and 262 is known in the art.

Figure 10:
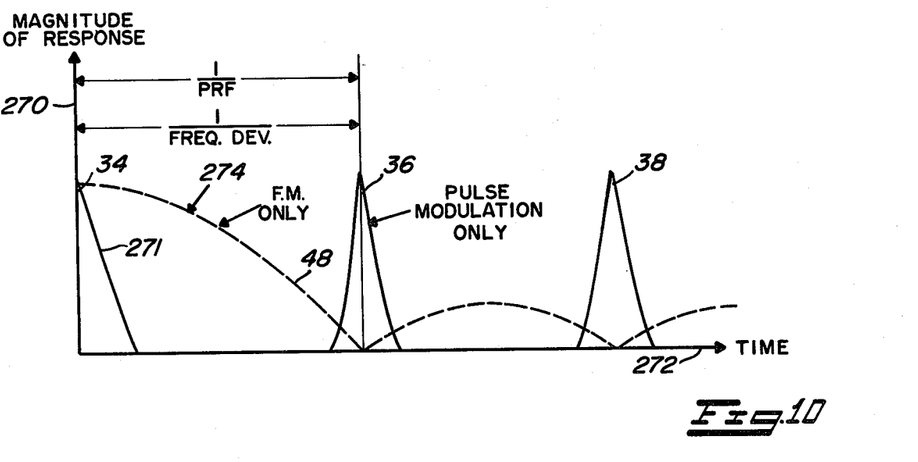
FIG. 10 is a graph of amplitude versus time illustrating the desired reduction of unwanted, ambiguity peaks on the time axis by combining a pulse modulated signal and a frequency modulated signal in accordance with the invention.

FIG. 10 illustrates the result affectuated by the previously described modulation process performed by modulation code generator 60. The correlation functions in accordance with FIGS. 3 and 4, as defined by a two-dimensional ambiguity plot taken on planes intersecting the amplitude and time axis, are shown in FIG. 10. More specifically, solid line peaks 34, 36, and 38 of FIG. 10 correspond to peaks 34, 36, and 38 along the time axis of FIG. 3 of the ambiguity function for the pulse modulated doppler radar. Dashed line graph 274 corresponds to the first three nodes of the dashed graph along time axis 42 of FIG. 4 and including peak 48. Solid line peaks 34, 36, and 38 correspond to range ambiguities inherent in the pulse modulated signal of FIG. 6, line C, which is applied to mixer 108 of code generator 60 and dashed line curve 274 corresponds to range ambiguities inherent in linear sawtooth FM signal 162 which is also applied to mixer 108. In effect, mixer 108 multiplies the dashed ambiguity characteristic 274 of the linear sawtooth, FM signal by the solid ambiguity characteristic 271 of the pulse modulated signal. As shown in FIG. 10 by choosing the frequency deviation of the FM equal to the PRF of the pulse modulated signal, the nodes of the FM radar ambiguity correspond to the undesired ambiguity peaks 36 and 38 of the pulse modulated signal. Hence, multiplication of these two characteristics, in effect, causes a substantial increase in the amplitude of the desired composite response characteristic located near the intersection of amplitude and time axes 270 and 272, and also in a desired attenuation of the undesired peaks along the time and frequency axes. In other words, the product of these two characteristics practically is zero at the location of ambiguity peaks 36 and 38 and is a maximum at peak 34, the desired one.

Figure 11:
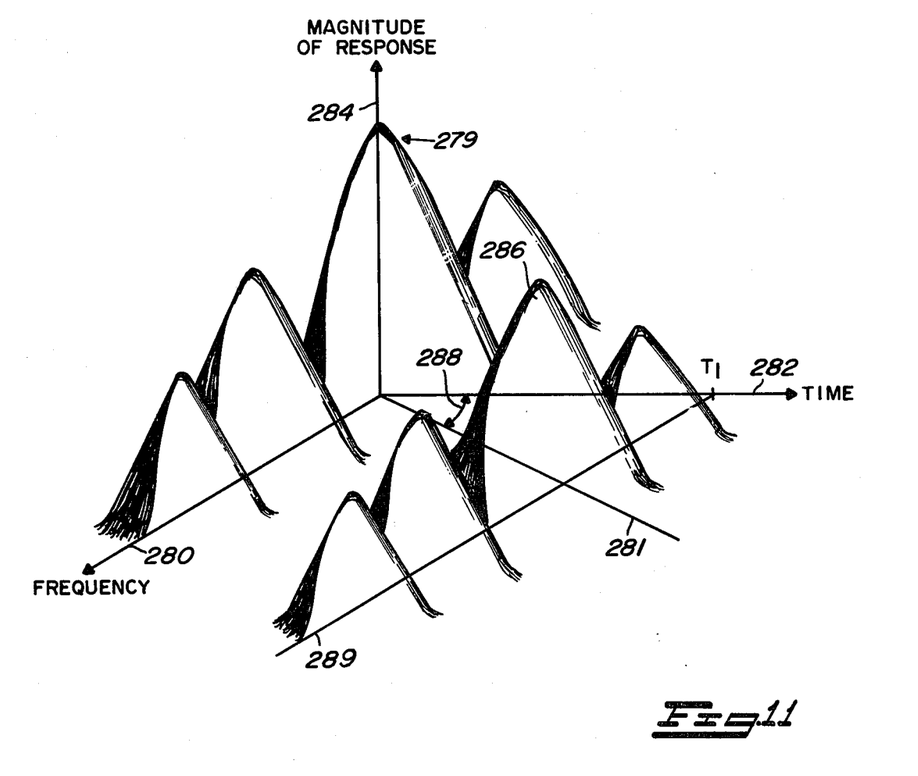
FIG. 11 is an ambiguity diagram illustrating the shift of peak ambiguity responses off of the range axis in accordance with the method of the invention.

The modulation system and method of the subject invention creates a composite ambiguity response for a radar which is similar to an ambiguity response of a pulse modulated radar, but one which is rotated about the amplitude axis so that undesired ambiguities are moved off of the time axis. The ambiguity map of FIG. 11 illustrates a selected portion of the ambiguity characteristic for radar system 211. The desired response characteristic 279 at the intersection of frequency axis 280, time axis 282, and amplitude axis 284 has an amplitude equal to the amplitude of the desired response of a pulse modulated radar of equal power. Also the undesired peak 286 and all subsequent peaks have been shifted away from time axis 282 and now are centered about line 281 which makes an angle 288 with respect to time axis 282. Undesired ambiguity peaks formerly existing on the frequency axis are not shifted. Axis 289 still intersects time axis 282 at time $T_1$ of FIG. 3 and is parallel to axis 280.

Figure 12:
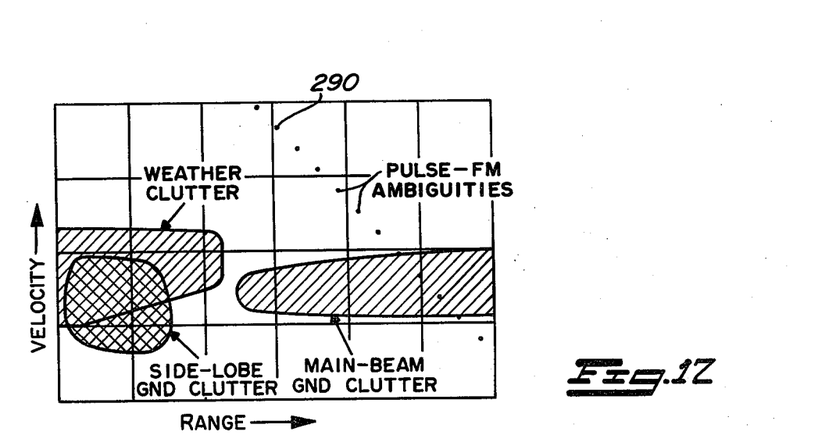
FIG. 12 is a clutter map similar to FIG. 2 illustrating the peak ambiguity response according to the method and modulation system of the invention.

The area of circles 290, shown on FIG. 12, represent the resulting shifted ambiguity peaks created by utilizing the method and system of modulation of the invention. As may be understood in comparing FIGS. 2 and 12, the area of the circles 290 within the main beam ground clutter area 18 (FIG. 12) and underlying ambiguity peaks 290 is less than the areas of either the circles 56 and the rectangle represented by line 58 within the clutter areas. For the purpose of the clutter map of FIG. 12, it is again assumed that the PRF and deviation have been selected to remove the velocity ambiguities from the velocity range of interest. Thus, only one row of ambiguities are shown. The number of possibilities from which radar system of FIG. 9, employing modulation code generator 60 must choose to arrive at a target range, is substantially reduced as compared to prior art systems having either the same repetition rate or the same frequency deviation. Hence, the effectiveness of the radar is increased by employing the method and system of modulation of the invention.

What has been described, therefore, is a method and system of radar modulation which results in a reduction of ambiguity peaks within a desired range-velocity area of operation with respect to either prior art, pulse modulated or prior art linear sawtooth, FM. As a result, the tolerable upper limit of the repetition rate of PRF of the radar signal can be increased to thereby remove frequency ambiguities from the range of velocities of interest while creating only the same number of ambiguity responses along the time axis, as in prior art radars having lower PRFs. Alternatively, as compared to prior art radars having the same PRF, a radar including the modulator of the invention creates less ambiguity peaks along the range axis.

Although various frequencies and repetition rates have been described in explaining the invention, it will be apparent to one skilled in the art that other choices could be made without departing from the scope and spirit of the present invention so long as the frequency deviation of the FM signal is made equal to the PRF of the pulse modulated signal and the modulation rate of the FM signal is a submultiple of the PRF of the pulse modulated signal. The modulation method and system of this invention is particularly attractive for use in applications for airborne/air target acquisition radars requiring high repetition rates and transmitting only moderate peak and average powers. Furthermore, since the design can be implemented utilizing integrated circuitry, the modulation system is simple, inexpensive, reliable and compact.

What is claimed is:

1. A modulation code generator for use in a pulsed radar system to shift some of the unwanted ambiguity peaks off of the time axis, including in combination:
   first oscillator means providing a pulse modulated signal at an output terminal thereof, said pulse modulated signal having a pulse repetition rate;
   second oscillator means providing a frequency modulated signal at an output terminal thereof, said frequency modulated signal having a frequency deviation which is a multiple of said pulse repetition rate of said pulse modulated signal; and
   signal combining means having an output terminal, a first input terminal connected to said output terminal of said first oscillator means and a second input terminal connected to said output terminal of said second oscillator means, said signal combining means combining said pulse modulated and said frequency modulated signals to provide an output signal at said output terminal thereof during the times that said pulse modulated and said frequency modulated signals simultaneously exist, said output signal being suitable for transmission by a radar system and for shifting some of the unwanted ambiguity peaks off of the time axis.

2. The modulation code generator of claim 1 wherein said frequency modulated signal changes in a substantially linear fashion between predetermined minimum and maximum frequencies at a modulation rate which is a submultiple of said pulse repetition rate.

3. The modulation code generator of claim 1 wherein:
   said first oscillator includes a control terminal and said second oscillator means includes a control terminal; and
   further including timing means having output terminals connected to said control terminal of said first oscillator means and to said control terminal of said second oscillator means, said timing means providing first control signals to said first oscillator means and second control signals to said second oscillator means to effect phase coherence between said pulse modulated signal and said frequency modulated signal.

4. The modulation code generator of claim 3 wherein said timing means includes:
   third oscillator means providing a frequency stable oscillating signal at an output terminal thereof;
   divider means having an input terminal connected to said output terminal of said third oscillator means and an output terminal, said divider means providing a divided output signal in response to said frequency stable oscillating signal at said output terminal thereof; and
   multivibrator means having a first input terminal connected to said output terminal of said third oscillator means and a second input terminal connected to said output terminal of said divider means, said multivibrator means being responsive to said frequency stable oscillating signal and said divided output signal to remove leading edge jitter from said divided output signal.

5. The modulation code generator of claim 3 wherein said timing means includes:
   third oscillator means providing a frequency stable oscillating signal at its output terminal;
   first divider means having an input terminal connected to said output terminal of said third oscillator means and an output terminal, said first divider means providing a divided signal at said output terminal thereof which is frequency stable but has leading edge jitter; and
   first multivibrator means having a first input terminal connected to said output terminal of said third oscillator means and a second input terminal connected to said output terminal of said first divider means and an output terminal, said first multivibrator means providing said first control signals at said output terminal thereof for controlling said first oscillator means.

6. The modulation code generator of claim 5 further including:
   second divider means having an input terminal connected to said output terminal of said first divider means and an output terminal, said second divider means dividing said divided signal to provide a further divided signal at said output terminal thereof; and
   second multivibrator means having a first input terminal connected to said output terminal of said third oscillator means and a second input terminal connected to said output terminal of said second divider means and an output terminal, said second multivibrator means being responsive to said further divided output signal and said frequency stable oscillating signal to provide said second control signals at said output terminal thereof for controlling said second oscillator means.

7. The modulation code generator of claim 3 further including in combination:
- constant current source means having control and output terminals, said control terminal being connected to an output terminal of said timing means;
- integrating capacitor means having a terminal connected to said output terminal of said constant current source means;
- charging circuit means having a control terminal connected to an output terminal of said timing means and an output terminal connected to said terminal of said integrating capacitor means; and
- said charging circuit means being responsive to the existence of each of said second control signals to charge said integrating capacitor means to a predetermined voltage level, and said constant current source being responsive to the nonexistence of each of said second control signals to linearly discharge said integrating capacitor means so that a linear sawtooth waveform is thereby created at said terminal of said integrating capacitor means.

8. The modulation code generator of claim 7 wherein:
- said frequency of oscillation of said second oscillator means varies with variations in the magnitude of a voltage applied to a frequency control terminal of said second oscillator means;
- first circuit means connecting said frequency control terminal of said second oscillator means to said terminal of said integrating capacitor means so that the modulation rate and frequency deviation of said second oscillator means varies respectively with the repetition rate and amplitude change of said linear sawtooth waveform, said frequency deviation being equal to said pulse repetition rate;
- said second oscillator means further having a reset terminal, said second oscillator means being responsive to a voltage of a particular polarity applied to said reset terminal to terminate oscillation; and
- reset circuit means connecting said reset terminal to an output terminal of said timing means.

9. The modulation code generator of claim 5 wherein said first oscillator means is responsive to each of said first control signals to provide a burst of sinusoidal signal having a constant frequency.

10. The modulation code generator of claim 1 further including a bandpass filter connected to said output terminal of said signal combining means for selecting the frequency components of said output signal which are equal to one of the sum and difference of the frequency components of said frequency modulated signal and said pulse modulated signal.

11. The modulation code generator of claim 1 wherein said frequency modulated signal has a frequency deviation which is equal to said pulse repetition rate of said pulse modulated signal.

12. In a radar system having a transmitter with a gated pulse amplifier which is responsive to a pulse repetition frequency signal applied to its control terminal to amplify a modulation code signal applied to its input terminal, and a receiver having a mixer operated by a demodulating signal having a center frequency which is a predetermined amount apart from the center frequency of the modulation code signal, a modulation code generator for providing the modulation code signal, the demodulating signal, and the pulse repetition frequency signal including in combination:
- pulse repetition frequency generator means providing a frequency stable pulse repetition frequency signal at an output terminal thereof, said output terminal being connected to the control terminal of the gated pulse amplifier;
- first divider means having an input terminal connected to said output terminal of said pulse repetition frequency generator means and an output terminal, said first divider means providing a divided signal at said output terminal thereof in response to said pulse repetition frequency signal;
- first multivibrator means having an input terminal connected to said output terminal of said first divider means and an output terminal, said first multivibrator means being responsive to each of said divided signals to provide a reset pulse at said output terminal thereof;
- frequency modulated oscillator means having a control terminal coupled to said output terminal of said first multivibrator means and an output terminal, said frequency modulated oscillator means being responsive to each of said reset pulses to provide a frequency modulated signal having an initial frequency immediately after the termination of a reset pulse, said frequency of said frequency modulated signal continuously changing until a subsequent reset pulse is applied thereto, said frequency modulated signal having a total frequency deviation which is a multiple of said pulse repetition frequency and a center frequency which is spaced the predetermined amount from the center frequency of the modulation code signal; apart from
- first circuit means connecting said output terminal of said frequency modulated oscillator means to the mixer of the receiver so that said frequency modulated signal can operate as the demodulating signal;
- second multivibrator means having an input terminal connected to said output terminal of said pulse repetition frequency generator menas and an output terminal, said second multivibrator means being responsive to each of said pulse repetition frequency signals to provide a gating pulse at said output terminal thereof;
- gated single frequency oscillator means having a control terminal connected to said output terminal of said second multivibrator means and an output terminal, said gated single frequency oscillator means being responsive to each of said gating pulses to provide a burst of sinusoidal signal of a constant frequency during the duration of each of said gating pulses to create a pulse modulated signal at said output terminal thereof, said bursts each formed by a sinusoidal signal having a frequency which is greater than said pulse repetition frequency and the repetition rate of said bursts being equal to said pulse repetition frequency;
- first mixer means having a first input terminal connected to said output terminal of said gated single frequency oscillator and a second input terminal connected to said output terminal of said frequency modulated oscillator means and an output terminal, said first mixer means mixing said pulse modulated signal and said frequency modulated signal to provide the modulation code signal at said output terminal thereof; and second circuit means connecting said output terminal of said first mixer means to the input terminal of the gated pulse amplifier.

13. The combination of claim 12 wherein said first circuit means includes a power splitter circuit.

14. The combination of claim 12 wherein said second circuit means includes a bandpass filter for selecting the sums of the frequency components of said pulse modulated signal and said frequency modulated signal.

15. The combination of claim 12 wherein said pulse repetition frequency generator means includes:
master oscillator means providing a frequency stable signal at an output terminal thereof; and
second divider means having an input terminal connected to said output terminal of said master oscillator means and an output terminal, said second divider means providing said pulse repetition frequency signal at said output terminal thereof in response to said frequency stable signal.

16. The combination of claim 12 wherein said frequency modulated signal changes in a substantially linear fashion between predetermined minimum and maximum values at a modulation rate, said modulation rate being a submultiple of said pulse repetition frequency.

17. The combination of claim 12 wherein said frequency modulated oscillator means further includes:
constant current source means having control and output terminals, said control terminal being connected to said output terminal of said first multivibrator means;
integrating capacitor means having a terminal connected to said output terminal of said constant current source means;
charging circuit means having a control terminal connected to said output terminal of said first multivibrator means and an output terminal connected to said terminal of said integrating capacitor means; and
said charging circuit means being responsive to the existence of each of said reset pulses to charge said integrating capacitor means to a predetermined voltage level, said constant current source means being responsive to the non-existence of each of said reset pulses to linearly discharge said integrating capacitor means so that a linear sawtooth waveform is thereby created at said terminal of said integrating capacitor means, said linear sawtooth waveform being adapted to control said frequency deviation of said frequency modulated oscillator means.

18. A method of providing a radar signal having a particular modulation code which reduces demodulation ambiguities therein including the steps of:
generating a pulse repetition frequency signal having a pulse repetition frequency of a predetermined value;
gating the operation of a continuous frequency oscillator with said pulse repetition frequency to provide bursts each of which includes cycles having a single frequency, each of said bursts occurring at said pulse repetition frequency;
dividing the pulse repetition frequency signal to provide a divided signal;
generating a linear sawtooth ramp signal synchronized with said divided signal;
controlling the modulation rate of a linear sawtooth, frequency modulated signal with said divided signal;
maintaining the frequency deviation of each complete cycle of modulation of said linear sawtooth, frequency modulated signal to be a multiple of the pulse repetition frequency with the amplitude of said linear sawtooth ramp signal; and
mixing said bursts of continuous wave signal and said linear sawtooth, frequency modulated signal; and
selecting one of the sum and difference of the frequency components of said linear sawtooth, frequency modulated signal and said continuous wave signal to provide the desired radar signal.

19. The method of claim 18 further including the step of using said frequency modulated, linear sawtooth signal to demodulate a returning radar signal.

20. A method of decreasing range ambiguities inherent in a pulse modulated radar system having a pulse repetition frequency, including the steps of:
producing a pulse modulation correlation function comprised of one desired range information peak and some undesired range ambiguity peaks located with respect to said range information peak as a function of the pulse repetition frequency;
producing a frequency modulation correlation function associated with a signal deviation which is a perfect multiple of the pulse repetition frequency to cause the time location of the nulls of the linear sawtooth, frequency modulation correlation function to correspond to the time location of the range ambiguity peaks of said pulse modulation correlation function; and
combining said pulse modulation correlation function and said frequency modulation correlation function together for producing substantial attenuation of at least some of said range ambiguity peaks by the nulls of said frequency modulation correlation function.

21. The method of claim 20 including the additional step of:
providing said pulse repetition frequency associated with said pulse modulation correlation function with a magnitude which optimizes the removal of velocity ambiguities from within possible target velocity limits of interest.

22. The method of claim 20 including the additional steps of:
providing said deviation associated with said frequency modulation correlation function from a signal having a linear sawtooth nature and having a range equal to said pulse repetition frequency.

23. The method of claim 22 including the additional steps of:
providing said linear sawtooth, frequency modulation correlation function with a peak corresponding to said desired range information peak and therefore said step of combining said pulse modulation correlation function with said frequency modulation correlation function together does not decrease the magnitude of the resulting range information peak.

24. A method of decreasing range ambiguities inherent in a pulse modulated radar system having a pulse repetition frequency and which is utilized for measuring the ranges of targets within a predetermined distance limit and the velocities of targets within a predetermined velocity limit, including the steps of:

producing a pulse modulation correlation function comprised of one desired range information peak and some undesired range ambiguity peaks located with respect to the location of said range information peak as a function of a pulse repetition frequency;

controlling said magnitude of said pulse repetition frequency to be high enough to shift the velocity ambiguity peaks outside of the predetermined velocity limit;

producing a linear sawtooth, frequency modulation correlation function associated with a signal deviation which is a perfect multiple of the pulse repetition frequency to cause the time location of the nulls of the linear sawtooth, frequency modulation correlation function to correspond to the time location of the range ambiguity peaks of said pulse modulation correlation functions, said linear sawtooth, frequency modulation correlation function having a desired peak corresponding to said desired range information peak of said pulse modulation correlation function; and multiplying said pulse modulation correlation function and said linear sawtooth, frequency modulation correlation function together for producing substantial attenuation of at least some of said range ambiguity peaks by the nulls of said linear sawtooth, frequency modulation correlation function.

25. The method of claim 24 including the additional steps of:

controlling said deviation associated with said linear sawtooth, frequency modulation correlation function equal to said pulse repetition frequency.

* * * * *

UNITED STATES PATENT OFFICE
CERTIFICATE OF CORRECTION

PATENT NO. : 3,883,871
DATED : May 13, 1975
INVENTOR(S) : Randolph G. Moore

It is certified that error appears in the above-identified patent and that said Letters Patent are hereby corrected as shown below:

After item 76, on the front page, add --Assignee, Motorola Inc., Franklin Park, Illinois--

Signed and Sealed this eleventh Day of November 1975

[SEAL]

Attest:

RUTH C. MASON
Attesting Officer

C. MARSHALL DANN
Commissioner of Patents and Trademarks